N. LACROIX.
Middlings Purifiers.

Patented May 27, 1873.

N. LACROIX.
Middlings Purifiers.
No. 139,397.
7 Sheets--Sheet 2.
Patented May 27, 1873.
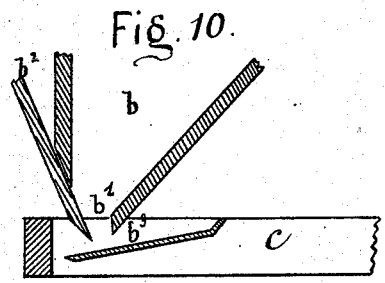
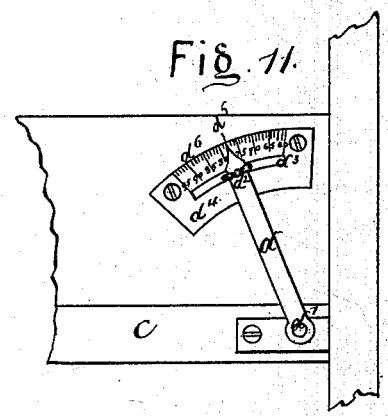
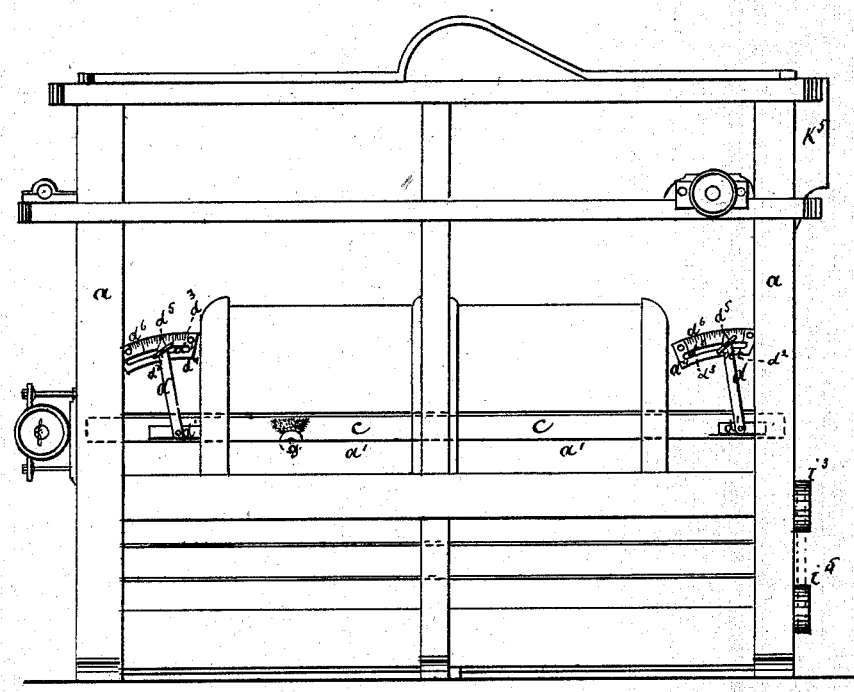
Witnesses
A. P. Lacey
W. A. Dangerfield
Inventor
Nicholas Lacroix
by Colborne Brookes & Co
his attorneys 7 Sheets--Sheet 3.

N. LACROIX.
Middlings Purifiers.

No. 139,397. Patented May 27, 1873.

Witnesses
A. P. Lacey
W. A. Dangerfield

Inventor
Nicholas Lacroix
by Colborne Brookes & Co
his attorneys

N. LACROIX.
Middlings Purifiers.

No. 139,397. Patented May 27, 1873.

Witnesses
A. T. Lacey
W. A. Dangerfield

Inventor.
Nicholas Lacroix
By Colborne Brookes & Co
his attorneys

N. LACROIX.
Middlings Purifiers.

Patented May 27, 1873.

Witnesses.
A. P. Lacey
W. Allen Dangerfield

Inventor:
Nicholas Lacroix
by Colborne Brookes & Co
his attorneys

N. LACROIX.
Middlings Purifiers.

Patented May 27, 1873.

Witnesses
A. Lacey
W. A. Dangerfield

Inventor
Nicholas Lacroix
by Colborne Brookes & Co
his attorneys

UNITED STATES PATENT OFFICE.

NICHOLAS LACROIX, OF MILWAUKEE, WISCONSIN.

IMPROVEMENT IN MIDDLINGS-PURIFIERS.

Specification forming part of Letters Patent No. 139,397, dated May 27, 1873; application filed April 12, 1873.

*To all whom it may concern:*

Be it known that I, NICHOLAS LACROIX, of Milwaukee, in the county of Milwaukee, in the State of Wisconsin, have made certain Improvements in Middlings-Separators, of which the following is a specification:

My invention relates to improvements in apparatus whereby that portion of the meal called middlings, obtained in the manufacture of flour from wheat, is purified by separating from such middlings the fine bran and other light fibrous substances, and any coarse matter which may be mixed with the same, as will be more fully hereinafter described. In carrying out my invention the middlings to operated upon are fed to an inclined hopper, the lower end of which is provided with a mouth or opening regulated by a slide or valve from which the middlings pass in regulated quantities to an inclined board or plate supported and carried by a vibrating frame or shaker. The middlings so supplied to the feeder are discharged onto the bolt-cloth by the motion of the vibrating frame or shaker hereinafter described. The vibrating frame or shaker is composed of a rectangular frame, to the under side of which a bolt-cloth of graduated fineness is affixed, as will be understood by persons acquainted with this class of machinery. The bolt-cloth is affixed to the shaker at the front end by nails or other suitable means, while the opposite end is sewn or otherwise attached to a piece of cloth or other material the end of which is by preference turned over and sewed in the form of a hem to receive a bar-plate or rod, to which screw attachments are affixed to regulate the tension of the bolt-cloth lengthwise. The tension of the bolt-cloth sidewise is regulated by bars or rods passing from side to side of the vibrating frame or shaker, which are provided with screws so arranged as to cause the sides of the vibrating frame or shaker to be drawn nearer to or further from each other. The vibrating frame or shaker is supported by means of hangers arranged in pairs on opposite sides at each end of the vibrating frame or shaker in such manner that the shaker always retains a horizontal or nearly horizontal position, and when reciprocating motion is communicated to it as hereinafter described, additional motion is imparted to it such as to cause the middlings upon the bolt-cloth to be thrown upward from the bolt-cloth and at the same time such middlings are caused to travel along the same, the effect of which motion is to submit the middlings more thoroughly to the action of the draft of the fan while being thrown upward from the bolt-cloth; and also when returning to the bolt-cloth an impetus is given to such middlings whereby the finer portions more readily fall through the bolt-cloth and the coarse, useless stuff is caused to pass toward and finally over the tail of the bolt-cloth. The lower end of each of the hangers is attached to the shaker by a pin-joint, while the upper end of each is supported by a screw-bolt affixed with capability of turning and sliding in a slot or groove in a plate attached to the framing, such slot or groove forming an arc of a circle, the center of which is the pin-joint at the lower end of the hangers, so arranged that by shifting the screw-bolt in the upper end of the hangers the throw and lift, as well as the inclination of the shaker, may be increased or diminished. By shifting the position of the screw-bolts supporting the hangers at either end of the shaker, the rapidity of motion of the middlings along the bolt-cloth may be varied at either end independently. Reciprocating motion is communicated to the shaker by adjustable eccentrics, each composed of two eccentric surfaces, one within the other. The inner eccentric surface is affixed to the driving-axis and the outer is so arranged that it may be turned on the inner in such maner as to increase or diminish the throw imparted to the shaker. The outer and inner surfaces are retained in position by a screw or other suitable means and each pair is graduated, in order that it may be correspondingly adjusted. A rubbing-surface, composed of lambs'-pelt, fur, cloth, or other soft material, by preference held between two strips of metal or wood, forming a clamp, or a revolving or other brush is caused to travel to and fro underneath the bolt-cloth, in order that the meshes of the same may be kept open and prevented from becoming clogged by fine matter during the operation of the machine. The clamp to which the rubbing-surface is affixed is supported by means of pulleys or wheels running upon rails or guides at each side of the apparatus. The clamp is caused to travel backward and forward by means of a tubular gide, operated by means of a dog working in the threads of a double-threaded endless screw, which is caused to revolve by means of a strap or band or other suitable gearing. The threads of the endless screw are cut right and left handed and are so arranged that when, in the revolution of the screw, the dog has been caused to travel along one thread and carried the guide and its clamp and rubber the whole length of the bolt-cloth, the dog shall automatically follow the other thread or groove and carry the guide and its clamp and rubber back the reverse way the whole length of the bolt-cloth, and so on alternately. A compartment or chamber is formed above the bolt-cloth, provided with two vertical sides and two inclined ends. This chamber at its lower portion extends over the whole surface of the bolt-cloth, but gradually decreases in size in an angular direction toward the upper part, where it opens into a narrow curved passage which connects this chamber with the fan-chamber. The object of the peculiar arrangement and construction of this chamber is to equalize the suction-power of the draft of the fan through the whole surface of the bolt-cloth, whereby the necessity for the employment of shelves or draft-directing or distributing partitions between the entrance to the fan-chamber and the bolt-cloth is avoided. A hopper is so arranged immediately underneath the fan-case that the more valuable portions of the middlings may, in their passage from the upper part of the draft-regulating chamber to the fan-case, be caught and retained by such hopper. A slide is provided at the lower part of this hopper in order that the operator may examine, from time to time, the quality of middlings brought over by the draft, and regulate the velocity and consequent draft of the fan accordingly. The middlings falling through the bolt-cloth are conducted to one end of the apparatus by an endless screw or conveyer, which is contained in a case, the upper portion of the sides of which are constructed of a series of overhanging surfaces so arranged that the middlings in falling from the bolt-cloth are prevented from passing out between such overhanging surfaces, while at the same time openings are left between such overhanging surfaces, through which currents of air flow to the central part of the bolt-cloth to aid the ordinary currents (admitted by valves at the side of the apparatus) in preserving a uniform current of air through the entire surface of the bolt-cloth. The lower portion of this conveyer-case is constructed in the form of a trough, in order that the conveyer may readily act upon the purified middlings falling therein and conduct them to an opening in the bottom of the front end of the same, through which such purified middlings are discharged. An elongated opening is formed in the bottom of the rear end, through which the tailings are discharged, as well as such middlings as it may be found desirable to return to the apparatus to be again operated upon. This elongated opening is provided with a sliding-shutter or valve, whereby the extent of such opening may be regulated, thereby determining what portion of the middlings shall be allowed to pass away from the apparatus to be again operated upon. The fan employed for creating a draft through the apparatus is driven by a series of cone-pulleys so arranged that, by merely shifting a strap or band, the velocity of such fan can be increased or diminished at will.

But that my invention may be fully understood, I will describe the same in detail by the accompanying drawings.

Description of the Drawings.

Figures 1 and 2 represent opposite side views; Fig. 8, a plan view of the shaker and parts connected therewith; Fig. 10, an enlarged view of the feeder and a portion of the shaker; Fig. 11, an enlarged view of one of the hangers and parts connected therewith.

Figure 3:
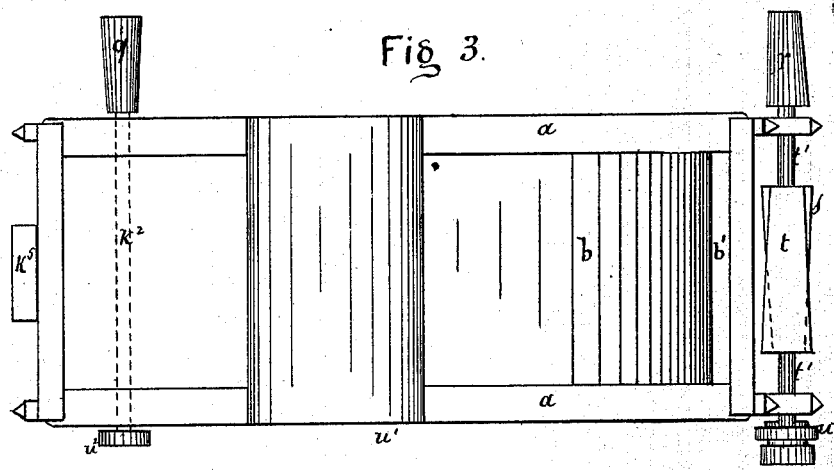
Fig. 3, a plan.
Figure 1:
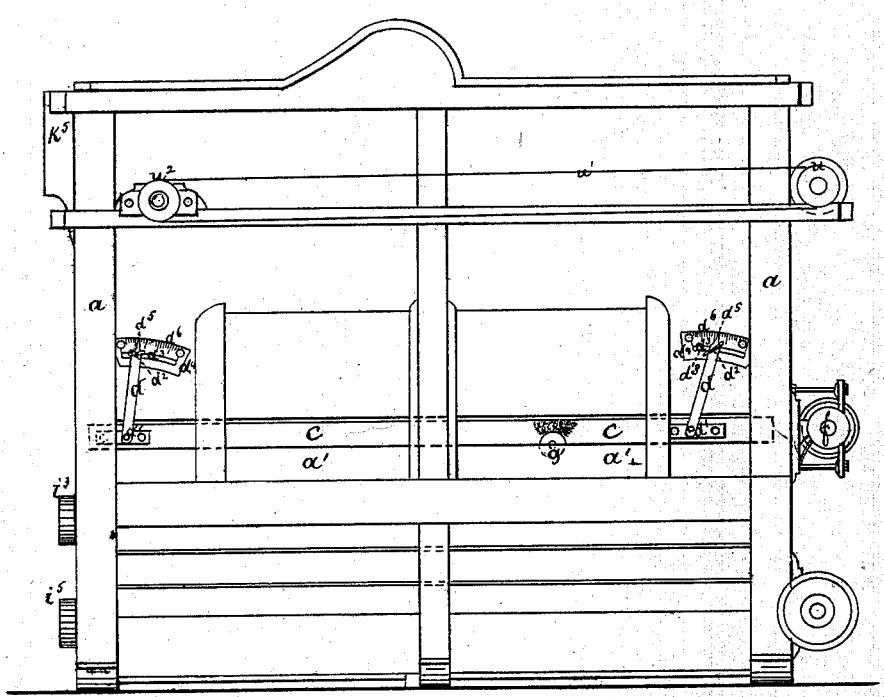
Figure 3:
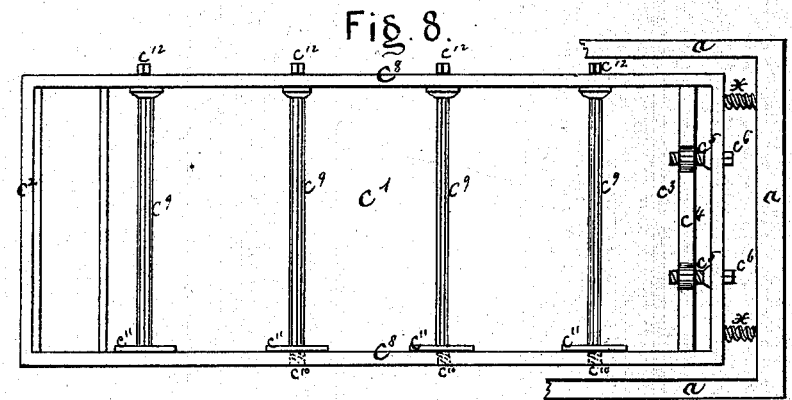
Figure 4:
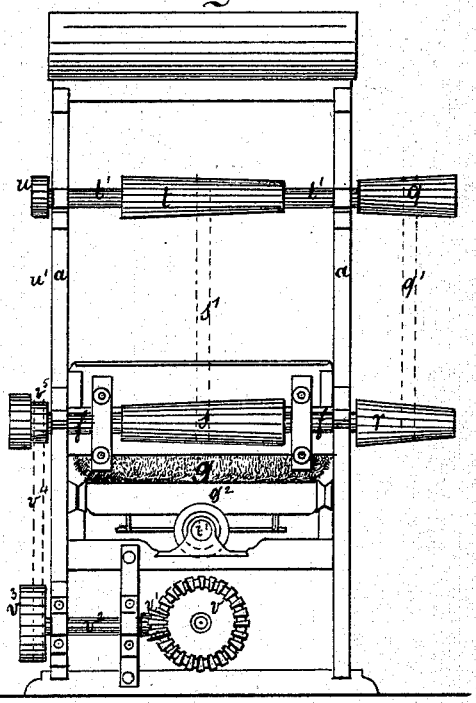
Fig. 4, a front view.
Figure 9:
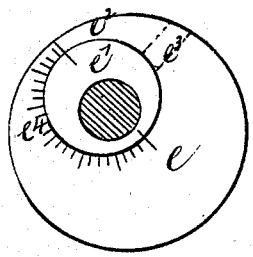
Fig. 9, an enlarged view of one of the adjustable eccentrics for regulating the motion of the shaker.
Figure 5:
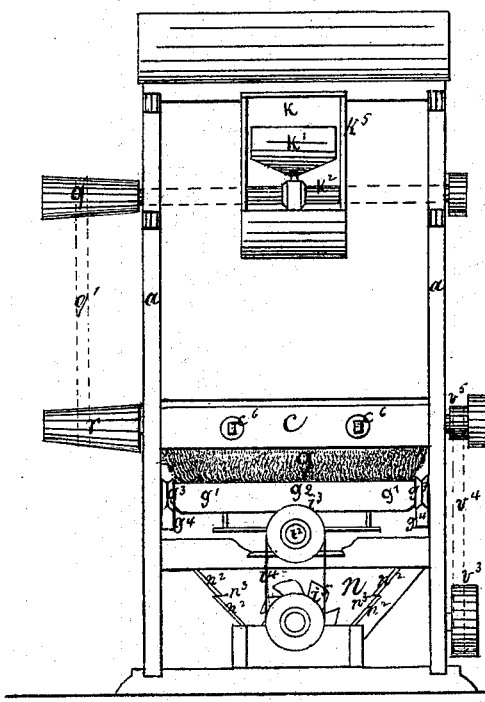
Fig. 5, a back view.
Figure 6:
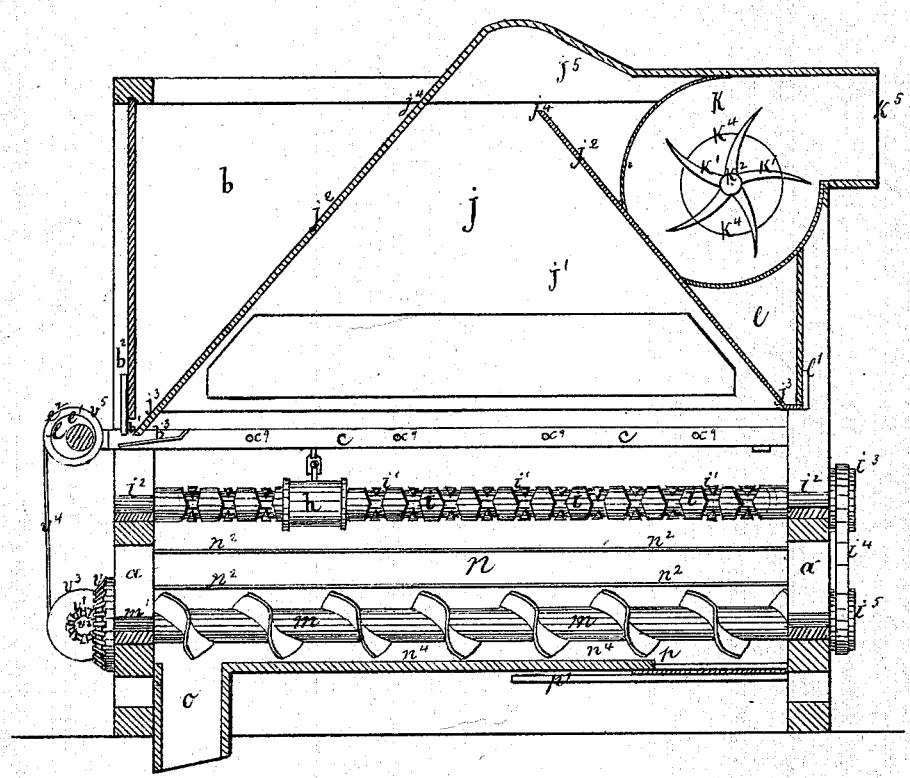
Fig. 6, a longitudinal section.
Figure 7:
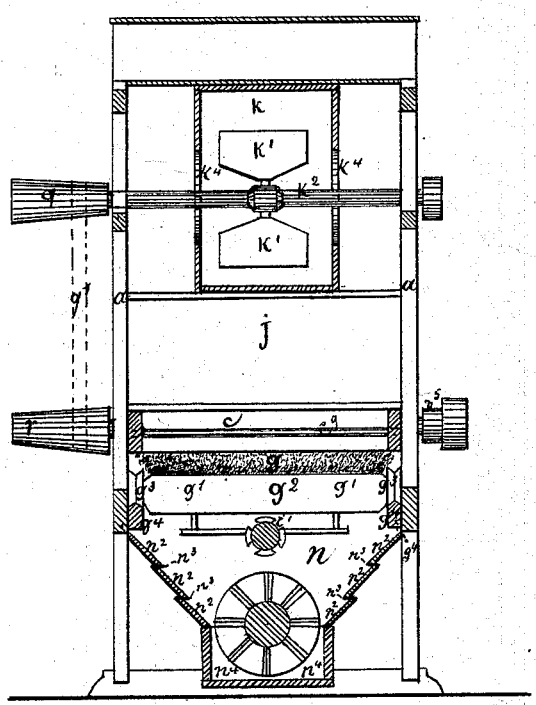
Fig. 7, a sectional end view, with improvements applied.
Figure 12:
Figs. 12, 13, and 14 are detail views of the rubber and guide.
Figure 14:
Figure 13:
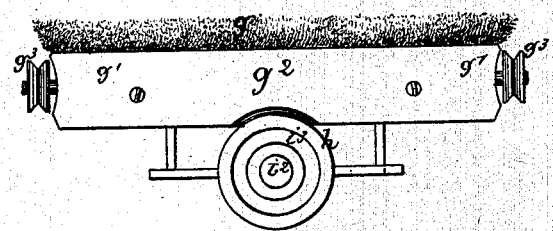

$a\ a$ is the main framing; $b$, an inclined hopper, into which the middlings to be operated upon are fed. $b^1$ is an opening at the lower end of the hopper $b$, regulated by a slide-valve, $b^2$, through which the middlings pass in regulated quantities to an inclined board or plate, $b^3$, which acts as the feeder, and is supported and carried by the vibrating frame or shaker $c$ in such manner that the compound motion of the shaker $c$, hereinafter described, causes the middlings supplied to the feeder $b^3$ to be discharged onto the bolt-cloth. The vibrating frame or shaker $c$ is composed of four rectangular sides, to the under side of which a bolt-cloth, $c^1$, of graduated fineness is affixed. This bolt-cloth $c^1$ is affixed to the shaker $c$ at the front end $c^2$ by nails or other suitable means, while the rear end $c^3$ of the bolt-cloth $c^1$ is sewed or otherwise attached to a piece of cloth, the end of which is by preference turned over and sewed in the form of a hem to receive a bar, plate, or rod, $c^4$, to which screw-attachments $c^5\ c^5$ are affixed in such manner that, by turning the screw-nuts $c^6$, the bar, plate, or rod $c^4$ may be drawn nearer to, or forced further from, the front end $c^6$ of the vibrating frame or shaker $c$, thereby regulating the tension of the bolt-cloth $c^1$ lengthwise. The bolt-cloth $c^1$ at the sides is by preference affixed to bars, plates, or rods which are attached to the sides $c^8$ of the vibrating frame or shaker $c$ by screws or other suitable means. The tension of the bolt-cloth $c^1$ sidewise is regulated by bars or rods $c^9$ passing from side to side of the vibrating frame or shaker $c$, one end, $c^{10}$, of each of which is formed with a screw-thread working in a corresponding screw-thread in a bed or plate, $c^{11}$, affixed to one side of the vibrating frame or shaker $c$, while the other end is provided with flanges working in bearings in the opposite side of the vibrating frame or shaker $c$, and having extended ends passing through such side, provided with a nut or head, $c^{12}$, by means of which the bars or rods may be turned on their axes; and in so doing they cause the sides to be drawn nearer to, or forced further from, each other, thereby increasing or diminishing the tension sidewise of the bolt-cloth $c^1$. In place of employing screws to the end of the bars or rods $c^9$, to regulate the tension of the bolt-cloth $c^1$, slots may be formed in such bars or rods for the reception of wedges or other equivalent mechanism, as will be readily perceived by any competent mechanic. The vibrating frame or shaker $c$ is supported by hangers $d$, arranged in pairs on opposite sides, at each end of shaker $c$. The lower end of each of these hangers $d$ is attached to the vibrating frame or shaker $c$ by a pin-joint, $d^1$, while the upper end of each is supported by a screw-bolt, $d^2$, affixed with capability of being turned and sliding in a slot or groove, $d^3$, in a plate or surface, $d^4$, attached to the framing $a$, such slot or groove $d^3$ forming an arc of a circle, the radius of which is equal to the distance between the pin $d^1$ and the screw-bolt $d^2$. The object of this groove $d^3$ is that, by shifting the position of the screw-bolt $d^2$ in the slot or groove $d^3$, the throw and lift, as well as the inclination of the vibrating frame or shaker $c$, may be increased or diminished, as may be found necessary from time to time, according to the nature and state of the middlings being operated upon. The upper ends of the hangers are provided with index-points $d^5$, in order that the corresponding hangers $d$ at each end of the shaker may be readily set by means of the screw-bolts $d^2$ in corresponding positions in the slots or grooves $d^3$. The plates or surfaces $d^4$ are provided with graduated scales or indexes at $d^6$, to facilitate the correct adjustment of the hangers $d$. By shifting the position of the screw-bolts $d^2$ supporting the hangers $d$ at either end of the shaker $c$, the rapidity of motion of the middlings along the bolt-cloth $c^1$ may be varied at either end of the vibrating frame or shaker independently of the other. $e\ e$ are compound adjustable eccentrics, composed of two eccentric surfaces, one within the other, by means of which reciprocating motion is communicated to the vibrating frame or shaker $c$. The inner surfaces $e^1$ of the eccentrics $e$ are formed on, or affixed to, the main driving-shaft $f$, while the outer eccentric surfaces $e^2$ are so arranged that they may be turned on the inner surface $e^1$ in such manner as to increase or diminish the throw of the eccentrics $e$, and consequently the extent of motion of the vibrating frame or shaker $c$. The outer and inner surfaces $e^1\ e^2$ are retained in position by a screw, $e^3$, or other suitable means, and each pair of surfaces $e^1\ e^2$ is provided with graduated scales or indexes $e^4$, Fig. 9, in order that each pair may be correspondingly adjusted. $x\ x$ are springs arranged at the rear end of the shaker $c$, for the purpose of keeping such shaker bearing against the eccentrics $e\ e$. $g$ is a rubbing-surface, composed of lamb's-pelt, fur cloth, or other soft material, which is, by preference, held between two strips of metal or wood, $g^1\ g^1$, which are screwed or otherwise held together, so as to form a clamp, $g^2$, which is caused to travel to and fro underneath the bolt-cloth $c^1$, in order that the meshes of the same may be kept open and prevented from becoming clogged by fine matter during the operation of the machine. The clamp $g^2$ is supported and guided by means of pulleys or wheels $g^3$, running upon rails or guides $g^4$ at each side of the apparatus. The clamp $g^2$ is caused to travel backward and forward by means of a tubular guide, $h$, operated by a dog, $h^1$, which is capable of turning in a bearing in the guide $h$, at its upper side, and at its lower side is so formed as to be received by one or the other of the threads $i^1$ of an endless double-threaded screw, $i$, which is supported in bearings $i^2$, and is caused to revolve by means of a pulley, $i^3$, which receives motion by a strap or band, $i^4$, from a pulley, $i^5$, to which motion is communicated, as hereinafter explained. The threads $i^1$ of the endless screw $i$ are cut right and left handed, and are so arranged that when, in the revolution of the screw $i$, the dog $h^1$ has been caused to travel along one thread, and has carried the guide $h$ and its clamp $g^2$ and rubber $g$ the whole length of the bolt-cloth $c^1$, the dog $h^1$ shall automatically follow the other thread or groove $i^1$, and carry the guide $h$ and its clamp $g^2$ and rubber $g$ back the reverse way the whole length of the bolt-cloth, and so on, alternately. $j$ is a compartment or chamber, arranged above the bolt-cloth $c^1$, the two sides $j^1$ of which are vertical, and the two ends $j^2$ inclined from the point $j^3$ to the point $j^4$. This chamber, at its lower part $j^3$, extends over the whole surface of the bolt-cloth $c^1$, but gradually decreases in width toward the part $j^4$, where it opens into a narrow curved passage, $j^5$, which connects this chamber with the fan-chamber $k$. The object of this peculiar arrangement and construction of the chamber $j$ is to equalize the suction-power of the draft of the fan through the whole surface of the bolt-cloth $c^1$, whereby the necessity for the employment of shelves or draft directing or distributing partitions in the chamber $j$ between the entrance to the fan-chamber and the bolt-cloth is avoided. $k^1$ is the fan, which is affixed to and revolves with the shaft $k^2$, and is inclosed in a case, $k$. $k^4$ are openings in the fan-case to the passage $j^5$. $k^5$ is a spout, through which the waste middlings are discharged. $l$ is a hopper, so arranged immediately below the fan-case $k$ that the more valuable portions of the middlings that are from time to time drawn up by the fan $k^1$, in their passage from the upper part of the draft-regulating chamber $j$ through the passage $j^5$ to the openings $k^4$ of the fan-case $k$, may fall and be caught and retained by such hopper $l$. $l^1$ is a slide or valve arranged at the lower portion of the hopper $l$, in order that the operator may from time to time examine the quality of the middlings brought over by the draft, and regulate the velocity and consequent draft of the fan $k^1$ accordingly. The middlings falling through the bolt-cloth $c^1$ are conducted to one end of the apparatus by an endless screw or conveyer, $m$, which is contained in a case, $n$, the upper portion of the sides of which are inclined and constructed of a series of surfaces, $n^2$, so arranged that they shall overlap each other and prevent the middlings, in falling from the bolt-cloth $c^1$, from dropping out between such surfaces $n^2$; at the same time openings $n^3$ are left between such surfaces $n^2$, through which currents of air flow to the central part of the bolt-cloth $c^1$, to aid the ordinary currents admitted by the valves $a^1$ formed in the side frame $a$, in preserving a uniform current of air through the entire surface of the bolt-cloth $c^1$. The lower portion $n^4$ of the conveyer-case $n$ is constructed in the form of a trough, in order that the conveyer $m$ may readily act upon the purified middlings falling therein, and conduct them to an opening, $o$, in the bottom of the front end of the same, through which such purified middlings are discharged. $p$ is an elongated opening, also formed in the bottom of this trough $n^4$, at the rear end, through which the tailings are discharged, as well as such middlings as it may be desirable to return to the apparatus to be again operated upon. This elongated opening $p$ is provided with a sliding shutter or valve, $p^1$, whereby the extent of such opening $p$ may be regulated, thereby determining what portion of the middlings shall be allowed to drop through the apparatus to be again operated upon. The fan-shaft $k^2$, hereinbefore referred to, according to one arrangement, is driven by means of a cone pulley, $q$, affixed thereon, which receives motion from a strap or band, $q^1$, from a cone-pulley, $r$, affixed on the main shaft $f$, to which motion is communicated by a drum or pulley and band or other suitable gearing. $s$ is another cone-pulley, also affixed on the main shaft $f$, by means of which, and a band or strap, $s^1$, motion may be communicated to a cone-pulley, $t$, affixed to or revolving on an axis, $t^1$, to the end of which a pulley, $u$, is affixed, by means of which and a band or strap, $u^1$, motion may be communicated to the pulley $u^2$ on the fan-shaft $k^2$.

It will be readily seen that the cone-pulleys $q$ and $r$ and $s$ and $t$ are graduated in the opposite direction, one to the other, in order that, by shifting the respective bands along their surfaces, the relative speed of the fan-shaft $k^2$ may be regulated. It will also be understood that only one pair of cone-pulleys, $q$ and $r$, or $s$ and $t$, will be employed at the same time.

Motion is communicated to the conveyer by means of a spur-wheel, $v$, which receives motion from a spur-wheel, $v^1$, affixed on a shaft, $v^2$, on the end of which the pulley $v^3$ is affixed, to which motion is communicated by means of a strap or band, $v^4$, passing over a pulley, $v^5$, affixed on the main shaft $f$. Motion is obtained to the screw $i$ by means of the pulley $i^3$, which receives motion from a strap or band, $i^4$, passing over a pulley, $i^5$, affixed on the axis $m^1$ of the conveyer $m$, to which motion is communicated, as before described.

Figure 15:
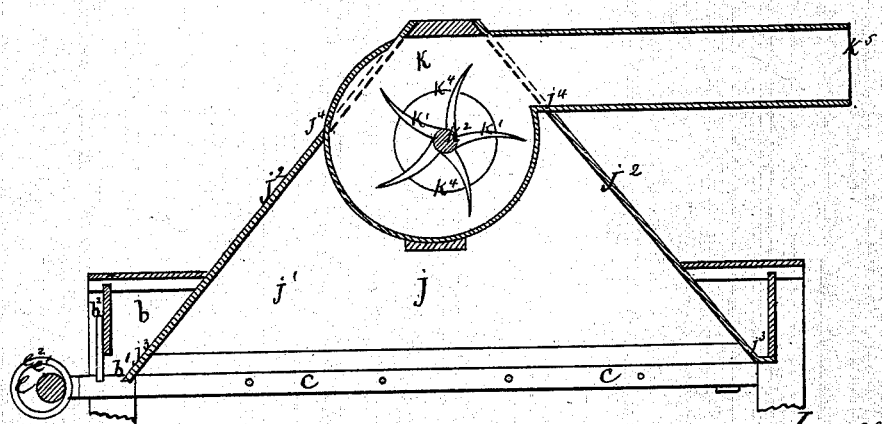
Fig. 15 represents a modification in the application of the fan.

Fig. 15 shows a sectional view of a slight modification of the upper part of the apparatus represented by the preceding figures. In this view each of the parts corresponding with parts shown in the previous views is marked with similar letters of reference. $b$ is the inclined feed-hopper into which the middlings are fed. $j$ is the draft-distributing chamber, in the upper part of which the fan-case $k$ is placed. $k^1$ is the fan, and $k^2$ is the fan-shaft. Openings $k^4$ are formed in each end of the fan-case $k$, which connect directly with the draft-distributing chamber $j$, instead of with the curved passage $j^5$, as in the previous arrangement. $k^5$ is the spout through which the waste middlings are discharged. In other respects the various parts of the apparatus are arranged and constructed as shown and described in the previous figures, except that the hopper $l$ is dispensed with. A revolving, or other brush, may be employed in place of the rubber $g$ and clamp $g^2$.

I do not in this application claim broadly for a double-threaded screw to reciprocate the brush or wiper underneath the bolt-cloth, or for hangers for suspending the shaker, as claims for such devices are incorporated in and form part of a distinct application of mine for improvement in middlings-purifiers.

Having thus described my invention, what I claim, and desire to secure by Letters Patent, is—

1. In a middlings-purifier, the inclined board or feeder $b^3$ attached to and operating with the shaker $c$, substantially as and for the purposes shown.

2. The means of regulating the tension of the bolt-cloth $c^1$ lengthwise, viz., the bar-plate or rod, $c^4$, and screw attachments, $c^5$, substantially as set forth.

3. In a middlings-purifier, the combination of the series of bars or rods $c^9$ provided with screw-threads for regulating the tension of the bolt-cloth $c^1$ transversely with the reciprocating shaker, substantially as and for the purposes described.

4. The conveyer-case, $n$, constructed with inclined overlapping surfaces $n^2$ and openings $n^3$, substantially as and for the purposes set forth.

5. In a conveyer-case, the combination of the inclined overlapping surfaces $n^2$, openings $n^3$, trough $n^4$, opening $o$, elongated opening $p$, and sliding shutter or valve $p^1$, substantially as set forth.

6. A middlings-purifier having the exhaust-chamber $j$, fan $k^1$, shaker $c$ vibrating upon hangers $d$, and a reciprocating wiper, $g$, actuated by a double-threaded screw, $i$, constructed and operating, substantially as and for the purposes described.

NICHOLAS LACROIX.

Witnesses:
JOSEPH WOOD,
CHARLES H. RIDDLE.